Patented Oct. 6, 1953

2,654,790

UNITED STATES PATENT OFFICE 2,654,790

MANUFACTURE OF DDT

Leo P. Curtin, Cranbury, N. J.

No Drawing. Application July 3, 1951,
Serial No. 235,091

4 Claims. (Cl. 260—649)

This invention relates to manufacture of DDT; and it comprises a method of producing 1,1,1-trichlor - 2,2-bis(p-chlorophenyl)ethane, commonly called DDT, wherein chloral and chlorobenzene are mixed with strong sulfuric acid; this mixture being agitated and maintained at temperatures within the range of about −10° to +25° C. while oleum is slowly introduced over a period of from about 40 to 90 minutes or more, the time depending on the efficiency of the removal of the heat of reaction; sufficient oleum being added to supply from about 0.5 to 1.3 moles of free $SO_3$ in the reaction mixture in addition to any required to bring the sulfuric acid to a concentration of 100 per cent $H_2SO_4$; sufficient chlorobenzene being added at least before the addition of oleum is completed to supply a total of from about 2.2 to 4.0 moles to 1 mole of chloral; a catalyst being also added to the reaction mixture in addition to any present in any recycled spent acid; said catalyst being an aromatic polysulfonic acid which is soluble in but substantially non-reactive towards the reaction mixture, the total quantity of catalyst present in the reaction zone at the start of the process amounting to from about 5 to 60 per cent by weight based on the weight of the chloral; the reaction mixture being agitated for a period of from about 1 to 6 hours, depending on the temperature used, until the reaction is complete, after which the DDT, which precipitates in the form of finely-divided, fluffy white crystals, is separated from the reaction mass, either by filtering or centrifuging or by solvent extraction; all as more fully hereinafter set forth and as claimed.

The commercial manufacture of DDT is a rather recent development. Several different methods of manufacturing this important insecticide have been described in the literature. Most of these methods involve the condensation of 1 mole of chloral with two moles of chlorobenzene in a sulfuric acid medium. In all of these methods with which I am familiar an excess of chlorobenzene is present in the reaction zone throughout the process and the DDT is recovered either in the form of gummy spheroidal masses ranging from the size of a pea to that of an orange or in the form of a molten mass. In both cases the recovered DDT contains quantities of unreacted chlorobenzene which can be eliminated only with considerable difficulty. The resulting products are so gummy that they cannot be ground at ordinary temperatures and it has therefore become conventional to grind them in the presence of solid carbon dioxide when a finely-divided product of high setting point is required. It is also true that the products produced in this fashion contain only from about 70 to 76 per cent of 1,1,1-trichlor-2,2-bis(p-chlorophenyl)ethane. The principal impurity is 1,1,1 - trichlor - 2 - o - chlorphenyl-2-p-chlorphenyl ethane, commonly known as ortho-para DDT. This material has relatively little insecticidal value but is present in proportions of 20 per cent, more or less, besides 5 per cent or more of a miscellaneous collection of impurities of which about 15 have been identified. The purity of this product is usually determined by making a "setting point" determination. A setting point is obtained rather than a melting point because of the high percentage of impurities in the commercial material. Nearly all commercial DDT is sold with a guaranteed minimum setting point of 89° C.—a Government specification.

I have discovered a method of making DDT which eliminates most of the difficulties mentioned above. In this method—I believe for the first time—a crystalline product is obtained which is sufficiently fine for most purposes. And this product can be ground, if desired, without the use of solid carbon dioxide. The product obtained analyzes from about 83 to 88 per cent of para-para DDT which means that the impurities present in the usual commercial product have been reduced by about 40 to 50 per cent. In addition this process results in a substantial saving of time. This process may be described briefly as follows:

A jacketed reaction vessel provided with an agitator is employed with a refrigerant flowing through the jacket at a rate sufficient to keep the temperature preferably within the range of from −2° to +2° C. during the reaction. Strong sulfuric acid is first introduced into the vessel. If the process has been conducted previously this acid may be the spent acid from the prior run and may amount to from about 30 to 60 per cent (preferably from 30 to 50 per cent) of the total spent acid recovered in the prior run. This acid is of value primarily as a diluent; it is spent so far as the reaction is concerned. The catalyst, more fully described below, the chloral to be used in the process and the chlorobenzene are added to the acid in the reaction vessel.

As soon as the batch has reached the desired low temperature the reaction is started by the addition of oleum while the batch is being agitated. I have found that the free $SO_3$ in the oleum acts as the condensation agent and that the rate of reaction can be controlled by the rate of its addition. From about 0.5 to 1.3 moles of free $SO_3$ must be supplied per mole of chloral in addition to any required to bring the sulfuric acid up to a concentration of 100 per cent $H_2SO_4$. The optimum quantity of $SO_3$ to be added after the sulfuric acid is brought up to 100 per cent strength is about 1 mole $SO_3$ per mole of chloral plus from about 3 to 10 per cent additional, to allow for that consumed by side reactions. The oleum may contain from about 10 to 65 per cent free $SO_3$—preferably 20–30 per cent—and it should be added slowly over a period of from about 30 to 90 minutes. The reaction mixture is then advantageously stirred for an additional two to four hours. The temperature may be allowed to rise slowly in this stirring period to a temperature, at the finish, of 10 to 15° C. The reaction mixture when produced as above described, is a magma of fine fluffy crystals of DDT and these can be readily removed by a centrifuge or filtered off, then washed with water and dried. Or, the crystals can be dissolved in a water-immiscible organic solvent and the resulting solution separated from the acidic lower layer.

The filtrate obtained after the crystals of DDT are separated is a golden or amber colored spent acid which in addition to sulfuric and sulfonic acids, contains from zero to three percent of water. The lower the temperature used in the process, the purer the spent acid obtained. When reaction temperatures above about 11° C. are employed the spent acid is too impure to be advantageously cycled. For this reason I usually prefer to employ reaction temperatures not substantially exceeding 11° C.

If it is preferred to employ solvent extraction to separate the crystals of DDT from the reaction mass, a low-boiling water-immiscible organic solvent is used. This solvent must be, of course, substantially inert toward the reaction components. Any solvent for DDT which fulfills these conditions is suitable. Examples are petroleum fractions boiling between about 50° to 100° C. which may contain substantial proportions of cycloparaffins and/or aromatics, carbon tetrachloride and trichlorethylene.

It should be noted that the spent acid obtained from other DDT processes is a dark, foul material containing tars and many other impurities in high concentration. The industry conventionally either discards it or incinerates it to recover oxides of sulfur therefrom.

The crystalline product obtained as above described contains from 84 to 87 per cent of para-para DDT more or less and has a setting point about 96.5° C. or higher. And it is not even necessary to grind the product for ordinary purposes. If a very fine dusting powder is desired, however, it is only necessary to mix the crystals with an inert mineral filler, such as talc, followed by grinding. It is entirely feasible, however, to melt the DDT prepared by my process and thus effect a separation from water and water soluble materials.

I believe that the DDT is precipitated in my process in the form of finely-divided crystals for the reason that the product is much purer than the products produced in other processes. The catalysts appear to be largely responsible for the purity of my product since they have what might be called a para-directive effect in causing the formation of the para-para compound at the expense of the ortho-para compound. This in in addition to the accelerating effect the catalysts have on the reaction. Different catalysts possess these two properties in different degrees. The purity of the product also depends in an important degree upon the temperature used in the process. Owing to the fact that the catalysts in my process substantially increase the rate of reaction, for the first time it becomes feasible to employ temperatures as low as −2° to +2° C.

The catalyst used in my process may be any of the aromatic poly-sulfonic acids which are soluble in but substantially inert towards the acid present in the reaction zone. The total quantity of catalyst present in the reaction zone should be from about 5 to 60 per cent by weight based on the weight of the chloral. Part of the catalyst present may be derived from the recycled spent acid, since the catalyst remains substantially stable during the reaction. If spent acid is not employed in the process it is necessary, of course, to add the entire quantity of catalyst to the reaction mixture and I have found, surprisingly, that a minimum of about 5 per cent of catalyst must be employed based on the weight of the chloral in order to produce any appreciable effect upon the process. The requirement of such a large quantity of catalyst is surprising in view of the fact that in most organic processes the amount of catalyst required is often only 1 per cent or less. Even if spent acid is employed containing catalyst it is necessary to add at least about 3 per cent of catalyst separately to the reaction zone owing to the fact that a substantial proportion of the amount originally present in the reaction zone is lost in the spent acid that is not recycled. The quantity of catalyst required in the reaction zone varies considerably with the activity of the catalyst and with some relatively inactive catalysts it requires up to about 60 per cent by weight based on the weight of the chloral. An excess of catalyst over the minimum required usually does no harm but is merely wasted.

I have discovered that the activity of my catalysts depends upon the number of sulfonic groups they contain and also upon the type of substituent groups present in the aromatic part of the molecules. For satisfactory catalytic performance the catalysts should contain two or more sulfonic groups and the catalytic activity is enhanced by the presence of positive substituents in the organic radical, that is, substituents such as halogeno, nitro, cyano, carboxy, carbonyl, sulfonic groups etc. These groups enhance the acid properties of the compounds, i. e. they increase their ionization. Negative substituents, such as amino, hydroxyl or alkyl, may be present but these either decrease the catalytic activity or produce substantially no effect thereon.

Examples of the catalysts which are operative in my process are—

Benzene-1,3-disulfonic acid
Benzene-1,3,5-trisulfonic acid
Toluene-2,4-disulfonic acid
Xylene disulfonic acid (mixed)
n-Dodecyl-benzene-2,4-disulfonic acid
Tetradecyl-benzene di-sulfonic acid (mixed)
Naphthalene-1,5-disulfonic acid
Naphthalene-1,6-disulfonic acid
Diphenyl-4,4′-disulfonic acid
Chlorobenzene-2,4-disulfonic acid
1,2-Dichlorobenzene-3,5-disulfonic acid
1,4-Dichlorobenzene-2,6-disulfonic acid
Bromobenzene-2,4-disulfonic acid
Chlorobenzene-3,5-disulfonic acid
Phenol-2,4-disulfonic acid Diphenylmethane-2,4,2',4'-tetrasulfonic acid
Quinoline-5,7-disulfonic acid
Anthracene-1,5-disulfonic acid It is evident, of course, that many of the catalysts in the above list are merely of academic interest owing to their high cost. Some of the above compounds are slightly reactive in the reaction mixture and for this reason are not advantageous as the inert catalysts.

Cost, efficiency and ease of manufacture considered, it is probable that chloro benzene-2,4-disulfonic acid is the most advantageous catalyst to use. 1,2-dichlorobenzene-3,5-disulfonic acid is a probable second choice. To show the effect of negative substituents upon the efficiency of the catalysts it may be mentioned that xylene disulfonic acid is only about 60 per cent as efficient as 1,3-benzene disulfonic acid in accelerating the reaction. Halo substituents in the benzene nucleus substantially increase the efficiency of the catalysts.

Many of the catalysts listed may be manufactured conveniently and at low cost. For example, in the production of 1 chloro 2,4-disulfonic acid, the following procedure is very satisfactory:

|  | Parts by weight |
|---|---|
| (1) Chlorobenzene | 112.5 |
| (2) Sulfuric acid (65% free SO$_3$) | 250 |
| (3) Sulfuric acid s. g. 1.84 | 25 |

(1) is placed in a jacketed vessel, equipped with a stirrer and with very strong cooling, about half of (2) is run in over a period of 40 to 50 minutes, depending on the efficiency of the cooling. The monosulfonation is very exothermal. The best temperature for the monosulfonation is below 30° C., a range of 20° to 30° being satisfactory, although sulfonation takes place below 0° C. The product is now a liquid which is almost colorless, usually clear with a faint pinkish-amber tint. It may solidify to a mass of fine white crystals at this point if not heated promptly. The crystals remelt at about 70° C. The mixture is heated to about 130° C. and the remainder of (2) is run in over about 20 minutes as the second sulfonation is only slightly exothermal. The mixture is maintained at 160° C. to 190° C. for about 30 minutes, cooled somewhat and (3) added to destroy a little free SO$_3$ remaining. The product is a syrupy golden amber liquid containing about 70 per cent of the desired catalyst and this reaction mixture may be added to the DDT synthesis without further processing. The catalyst in example 1,1,2-dichlorobenzene-3,5-disulfonic acid, may be made by a similar procedure except that the final temperature is 170–200° C.

Chlorobenzene-2,4-disulfonic acid may be made at remarkably low cost, utilizing the p-chlorobenzene sulfonic acid present as a byproduct in the spent acid. The latter is highly soluble in water and also in strong sulfuric acid. If however to the spend acid about 15 percent by weight of water or ice is added and the mixture cooled, the p-chlorobenzene sulfonic acid precipitates out almost quantitatively in the form of fine crystals, ivory white to white in color.

A quantity of this precipitate containing 192.5 parts by weight of p-chlorobenzene sulfonic acid, is placed in a reaction vessel and 160 parts by weight of 65% oleum is added and the mixture is heated to and maintained at 160° C. for 30 to 60 minutes. The reaction mixture dissolves to a clear, homogeneous solution, sulfonation takes place mostly above 130° C. and the reaction is close to quantitative. 100 parts by weight of sulfuric acid, s. g. 1.84 is added. This neutralizes the excess sulfur trioxide and converts the viscous reaction product into a much more fluid, easily handled material. This product can be used directly as a catalyst without further processing. If heated much above 200° C. say, to 300° C., a substantial part of the 1,2,4 compound rearranges to the symmetrical 1,3,5-trichlorobenzene disulfonic acid. This is a good catalyst but not quite equal to the 1,2,4 compound.

The spent acid recovered in my process contains, aside from the catalyst added in the process, small proportions of various sulfonic acids, such as ortho-para and para-para DDT sulfonic acids, mono-chlorobenzene sulfonic acid and various other sulfonated byproducts formed in the reaction. These compounds may produce some catalytic action when the spent acid is recycled. But in no case have I found it possible to obtain satisfactory results in my process by relying solely upon the catalysts present in the recycled spent acid. It is usually necessary to add at least about 3 percent of catalyst in addition to any automatically recycled in the spent acid.

The water washing step of my process is advantageously conducted in counter-current and is highly effective owing to the crystalline nature of the DDT. If the washing step is done with care, the resulting product is 100 percent soluble in organic solvents. If 10 grams are warmed slightly with 100 grams of Stoddard solvent, for example, the DDT dissolves completely and cleanly, with no trace of residue. On cooling to 15° C. no change takes place. If the DDT contains a trace of moisture, say 0.01 percent, the solution in the petroleum solvent may develop a faint opalesence but nothing more.

Water washing also eliminates the acid from my product. The present commercial product usually contains free acid which has caused considerable difficulties due to corrosion of spray apparatus. That the product produced by my process is free from acid can be demonstrated by stirring 10 grams in 10 cc. of tap water. In one such test I found that the tap water had a pH of 6.5 and after stirring in the DDT it remained at this value for 48 hours. The mixture was then heated to boiling which melted the DDT. But after cooling the pH of the mixture was still 6.5.

It has been mentioned that the preferred reaction temperature for the present process is in the neighborhood of −2° to +2° C. It will operate of course at 15° C. and above although, with the catalyst used, the reaction is decidedly vigorous at such temperatures. It also proceeds well at −30° C., the reaction at that temperature being almost 50 percent as rapid as at 0° C. I have studied this reaction with disulfonic acid catalysts from +40° C. to −30° C. and find that decreasing the temperature increases the proportion of para-para DDT in the product. The reaction temperature recommended, −2° to +2° C. is a compromise. The action is as fast as convenient at that temperature, the physical form of the DDT is most desirable, the setting point of the product is unprecedentedly high, no tars or other colored products are formed, the reclaimed acid is clean and the yield excellent.

The following examples will illustrate the process. In all cases, the fuming acid is added at a fairly uniform rate over a period of 45 to 90 minutes or more.

Example 1

| | Parts by weight |
|---|---|
| (1) Chloral anhydrous | 147.4 |
| (2) Chlorobenzene | 295 |
| (3) Catalyst, 1,2-dichlorobenzene-2,5-disulfonic acid | 30 |
| (4) Sulfuric acid fuming, 21.5% free SO$_3$ | 418.0 |
| (5) Spent acid from preceding batch | 550.0 |

Items (5), (3), (1) and (2) are first added, usually in the order given, to a reaction kettle, jacketed and equipped with efficient stirring apparatus. After starting the stirrer and bringing the mixture to a 0° C. or a little below by means of brine or other cooling medium circulating in the jacket, the addition of (4) is commenced. This is completed in 60 minutes, the temperature being maintained at −1° to +2° C. approximately, at all times. After the reaction is complete, the reaction mass, now a thick magma of crystalline particles of DDT in a mother liquor of spent acid, is stirred for an additional two hours then dumped into a receiving vessel. The reaction kettle is now ready to receive another batch. The reaction mass is then filtered or centrifuged, washed thoroughly with cold water and dried. The product is now in suitable form for sale or conversion into insecticidal formulations. The yield of DDT, based on the chloral, is 94 per cent of theory. This product has a setting point of 95.5° C.

Example 2

| | Parts by weight |
|---|---|
| (1) Chloral anhydrous | 147.4 |
| (2) Chlorobenzene | 295 |
| (3) Catalyst, 1-chlorobenzene-2,4-disulfonic acid | 40 |
| (4) Sulfuric acid fuming, 19.5 percent sulfur trioxide | 450.0 |
| (5) Spent acid from former batch | 550.0 |

The procedure used in this run is the same as that used in Example 1 except for the fact that the fuming sulfuric acid is added over a period of 60 minutes and that the subsequent stirring is continued for a period of 150 minutes, making a 3½ hour reaction period. The yield of DDT is 93.5 percent based on the chloral and the setting point of the product is 96.5° C. to 97.1° C.

Example 3

| | Parts by weight |
|---|---|
| (1) Chloral | 145.5 |
| (2) Chlorobenzene | 295 |
| (3) Catalyst, benezene-1,3-disulfonic acid | 65 |
| (4) Sulfuric acid, fuming 20% free SO$_3$ | 445 |
| (5) Sulfuric acid 99% | 500 |

This example illustrates one method of starting a series of runs where no spent acid from a previous operation is available. The usual spent acid in this case is replaced by a 99 percent sulfuric acid and it is necessary to add from about 50 to 100 percent more catalyst owing to the fact that none is present in the acid used in the process. It is possible, of course to utilize strong sulfuric acid ranging in strength from about 90 to 100 percent but it is usually less expensive to utilize an acid having a concentration close to 100 percent since if an acid of lower strength is employed this requires the addition of more fuming acid or a fuming acid of higher SO$_3$ content.

In conducting this run the procedure used is substantially that used in Example 1 but the temperature is maintained between 5°–7° C. The addition period is 55 minutes and the subsequent stirring period 1½ hours. A DDT having a setting point of 93.5° C. is obtained in a yield of about 93.0 percent based on the chloral.

Example 4

| | Parts by weight |
|---|---|
| (1) Chloral | 147.4 |
| (2) Chlorobenzene | 290 |
| (3) Catalyst diphenyl - 2,4,4' - trisulfonic acid | 25 |
| (4) Sulfuric acid, 21.5%, free SO$_3$ | 416 |
| (5) Spent acid from preceding batches | 550 |

Same procedure used as in Example 1. The DDT has a setting point of 94° and the yield is about 92 percent.

Example 5

The procedure used is the same as that of Example 1 except that the catalyst employed is 24 parts of benzene-1,3,5-trisulfonic acid. An addition time of 45 minutes is used and the subsequent stirring period is 90 minutes. DDT setting point 94.5°; yield 92 percent.

Example 6

The procedure used is the same as that of Example 1 except that the catalyst employed is 35 parts of quinoline-5,7-disulfonic acid. An addition time of 50 minutes is used and the subsequent stirring period is 95 minutes. DDT setting point 94°; yield 19 percent.

Example 7

The procedure used is the same as that of Example 1 except that the catalyst employed is 53 parts of anthracene-1,5-disulfonic acid. DDT setting point 94°; yield 90 percent.

Example 8

Same procedure as in Example 2, except that the catalyst is 45 parts of diphenylmethane-2,4,2',4'-tetrasulfonic acid. DDT setting point 94°; yield 90 percent.

Example 9

Same procedure as in Example 2, except for the finishing of the batch. After the reaction is complete 200 grams monochlorobenzene is added to assist in separating the DDT from the spent acid, which now forms a well-defined lower layer. This is drawn off and the organic layer is washed free of acid. It is then steam-distilled to remove all chlorobenzene present. The DDT, now molten, forms a heavy lower layer and this is drawn off. A small amount of emulsified water is vaporized and the melted, anhydrous DDT is flaked or cast into cakes. Yield 93.7%; S. P. 95.8° C.

An extensive series of additional runs have been made with slight variations in the procedure described utilizing various aromatic polysulfonic acids as catalyst and with the production of DDT products having setting points within the range of about 92°–98° in yields ranging from about 91 to 95 percent of theory based on the weight of the chloral. My conclusion, that all aromatic polysulfonic acids are useful as catalysts in my process which are soluble in and substantially inert toward the sulfuric acid reaction medium, is based on these extensive tests.

The advantages obtained by my process can be summarized as follows:

1. A lower manufacturing cost, due to reduced time of reaction and use of recycled spent acid.
2. Higher rate of production.
3. Greatly simplified finishing procedure.
4. Excellent physical form obtained without special treatment.
5. Elimination of oil-insoluble residues.
6. Production of a spent acid having commercial value.
7. A purer product having a higher setting point, an unequaled high content of para-para DDT and less impurities.

While I have described what I consider to be the most advantageous embodiments of my process it is evident of course that various modifications can be made in the specific procedures which have been described without departing from the purview of this invention. I have already mentioned the fact that the spent acid obtained in my process is a relatively pure product substantially free from tarry matter. For this reason it is possible to utilize the acid which is not recycled for various purposes for which the spent acid derived from other processes would not be at all suitable. Thus my spent acid can be neutralized with ammonia to form a commercial ammonium sulfate suitable for use as a fertilizer. The acid can also be used in the production of precipitated barium sulfate and lead sulfate, as well as soluble sulfates, such as aluminum sulfate. This is in contrast to the serious trouble experienced by manufacturers of DDT using other processes to get rid of their waste acid. It is impossible to dispose of such acid by passing it directly into streams or harbors and some manufacturers have even been forced to purchase soda ash to neutralize it.

The quantities of chloral utilized in the foregoing specific examples are based on anhydrous chloral. It is possible, of course, to employ chloral in other forms, for example, as chloral hydrate, provided that the necessary increase in added sulfur trioxide is made.

As indicated previously the total quantity of catalyst in the reaction zone at the start of the process required to produce satisfactory results in my process depends in an important degree upon its effectiveness or activity in promoting the reaction and upon its para-para directiveness. The best of the catalysts which I have tested produce an appreciable effect when present in the reaction zone in total quantities amounting to only from about 5 to 10 percent of the chloral by weight, whereas some of the inferior catalysts should be present in quantities up to about 50 to 60 percent based on the weight of the chloral. In the above specific examples from about 20 to 30 percent of catalyst is added separately to the reaction mixture, not including the catalyst which is present in the recycled spent acid. The amount of spent acid which can be recycled depends, of course, upon the strength of the oleum used in the process. If a 65 percent oleum is used approximately 60 percent of the spent acid can be recycled and this, of course, will usually contain approximately 60 percent of the catalyst originally present in the reaction zone. When a 20–30 percent oleum is used the amount of spent acid recycled may amount to from about 30 to 50 percent of the total. If an expensive catalyst is used it may be cheaper to use a 65 percent oleum so that less catalyst is lost in the spent acid. It is possible, of course, to recover catalyst from the spent acid which is not recycled. This would not be difficult but in general would not be profitable, since several of the catalysts which are highly active in the process are also relatively inexpensive.

One of the most important features of the process for making DDT which is herein described is that it permits of the production of pure para-para DDT without the necessity of producing, simultaneously, large quantities of an unsaleable byproduct. As stated above, the joint Army and Navy specification for DDT requires a setting point of 89.0° C., minimum. This corresponds roughly to a para-para DDT content of 73.8 percent although there are some products which meet the setting point specification but which have as little as 71 percent para-para DDT.

It is evident that, if even a small amount of the para-para DDT content were removed from such material, the remainder would not meet any existing specification and would be not only unsaleable but a nuisance, as well. Such is not the case with the improved DDT herein described.

Consider a DDT made in accordance with Example 2, with 1-chloro-2,4-benzene disulfonic acid as the catalyst. Such a material, containing 85 percent or more of para-para DDT and 15 percent or less of impurities, is dissolved in a hot petroleum fraction in which it is extremely soluble. With a proper choice of temperatures and concentration, on cooling, 40 parts of para-para DDT will crystallize out in the form of beautiful pure white needles. This precipitate is washed with a little cold solvent, which is added to the next batch. The product is a 99.3 to 99.9 percent para-para DDT. The mother liquor retains all of the impurities, 15 parts, and the remainder of the para-para DDT, 45 parts. It will be noted that this is a solution of a 75 percent para-para DDT, a better than average material, which meets specifications and may be sold in solution form, for which there is a very large market, or recovered as a solid by evaporating the solution. The 99.3–9 percent product has been tested and found, in comparison with a 89° C. setting point DDT, to have much less unfavorable action on foliage.

The development of DDT has been hampered, in the past, by inability to produce the active principle, para-para DDT, in pure form without the wasteful production of large amounts of valueless byproduct. This obstacle is completely removed by the present invention, since 40 to 50 percent of the active principle may be recovered in pure form while the remainder is still a standard product.

Other modifications of my process which fall within the scope of the following claims will be immediately evident to those skilled in the art.

What I claim is:

1. In the manufacture of DDT the process which comprises condensing chloral and chlorobenzene in the presence of fuming sulfuric acid and from about 5 to 60 percent by weight based on the chloral employed of a catalytic agent selected from a class consisting of aromatic polysulfonic acids, containing from 2 to 4 sulfonic acid groups, which are soluble in but substantially non-reactive with the components of the reaction mixtures, cooling and agitating the resulting mixture within the range of from about −10° to +25° C. while slowly adding oleum and separating the resulting DDT from the reaction mixture; said oleum containing sufficient free SO₃ to supply from about 0.5 to 1.3 moles of free SO₃ per mole of chloral to the reaction mixture in addition to any required to raise the sulfuric acid concentration to 100 percent; sufficient chlorobenzene being used to supply a total of from about 2.2 to 4 moles chlorobenzene per mole of chloral.

2. The process of claim 1 wherein the catalyst employed in a sulfonic acid containing at least one positive substituent in its organic group.

3. The process of claim 1 wherein the catalyst employed is chlorobenzene-2,4-disulfonic acid.

4. The process of claim 1 wherein the reaction mixture contains from about 30 to 60 percent of spent acid obtained from a previous run of the same process in which an aromatic polysulfonic acid containing from 2 to 4 sulfonic acid groups was present in the reaction mixture.

LEO P. CURTIN.

References Cited in the file of this patent
UNITED STATES PATENTS

| Number | Name | Date |
|---|---|---|
| 2,460,865 | Wilson | Feb. 8, 1949 |
| 2,464,600 | Meitzner et al. | Mar. 15, 1949 |